C. A. DREISBACH.
VARIABLE SPEED TRANSMISSION MECHANISM.
APPLICATION FILED OCT. 11, 1911.
1,046,156.
Patented Dec. 3, 1912.
5 SHEETS—SHEET 1.
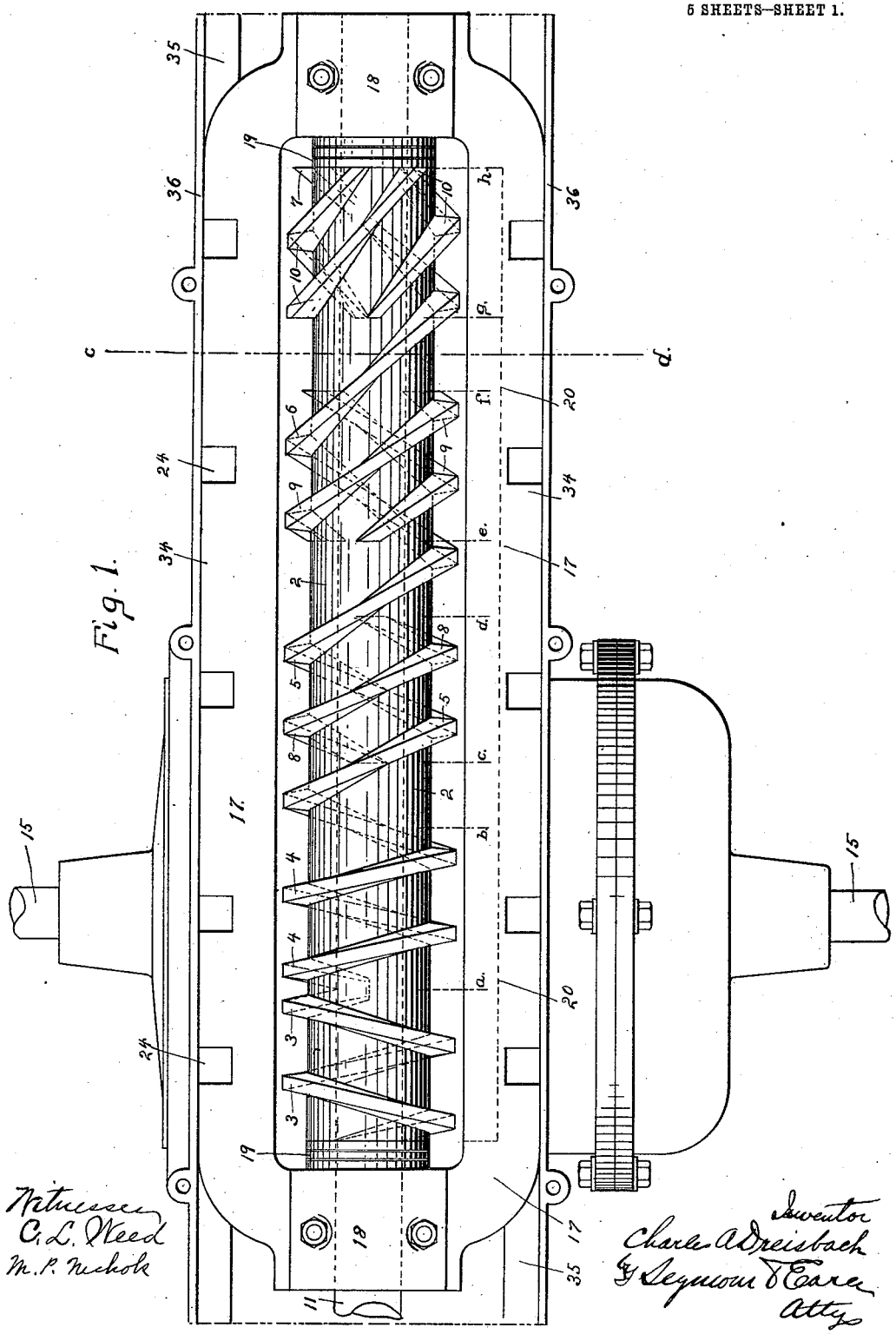

C. A. DREISBACH.
VARIABLE SPEED TRANSMISSION MECHANISM.
APPLICATION FILED OCT. 11, 1911.
1,046,156.
Patented Dec. 3, 1912.
5 SHEETS—SHEET 2.
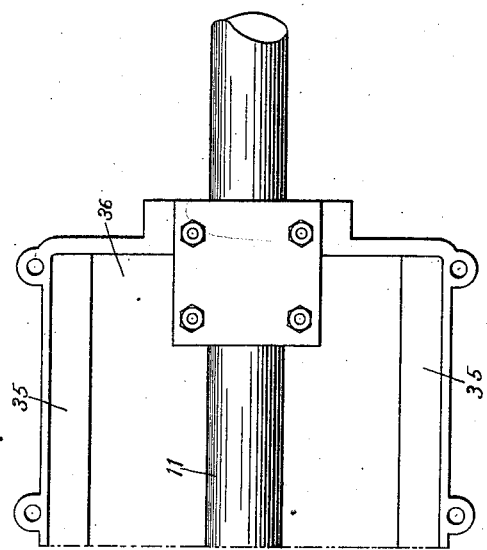
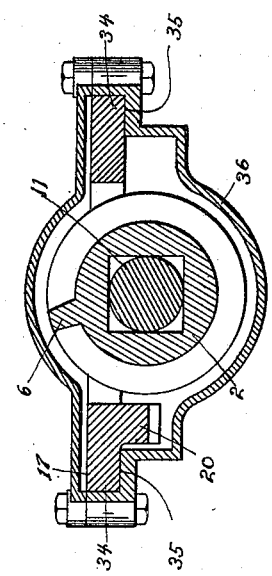
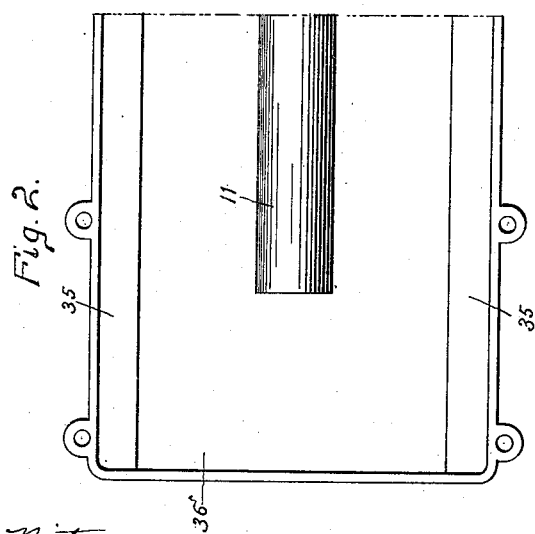

C. A. DREISBACH.
VARIABLE SPEED TRANSMISSION MECHANISM.
APPLICATION FILED OCT. 11, 1911.
1,046,156.
Patented Dec. 3, 1912.
5 SHEETS—SHEET 3.
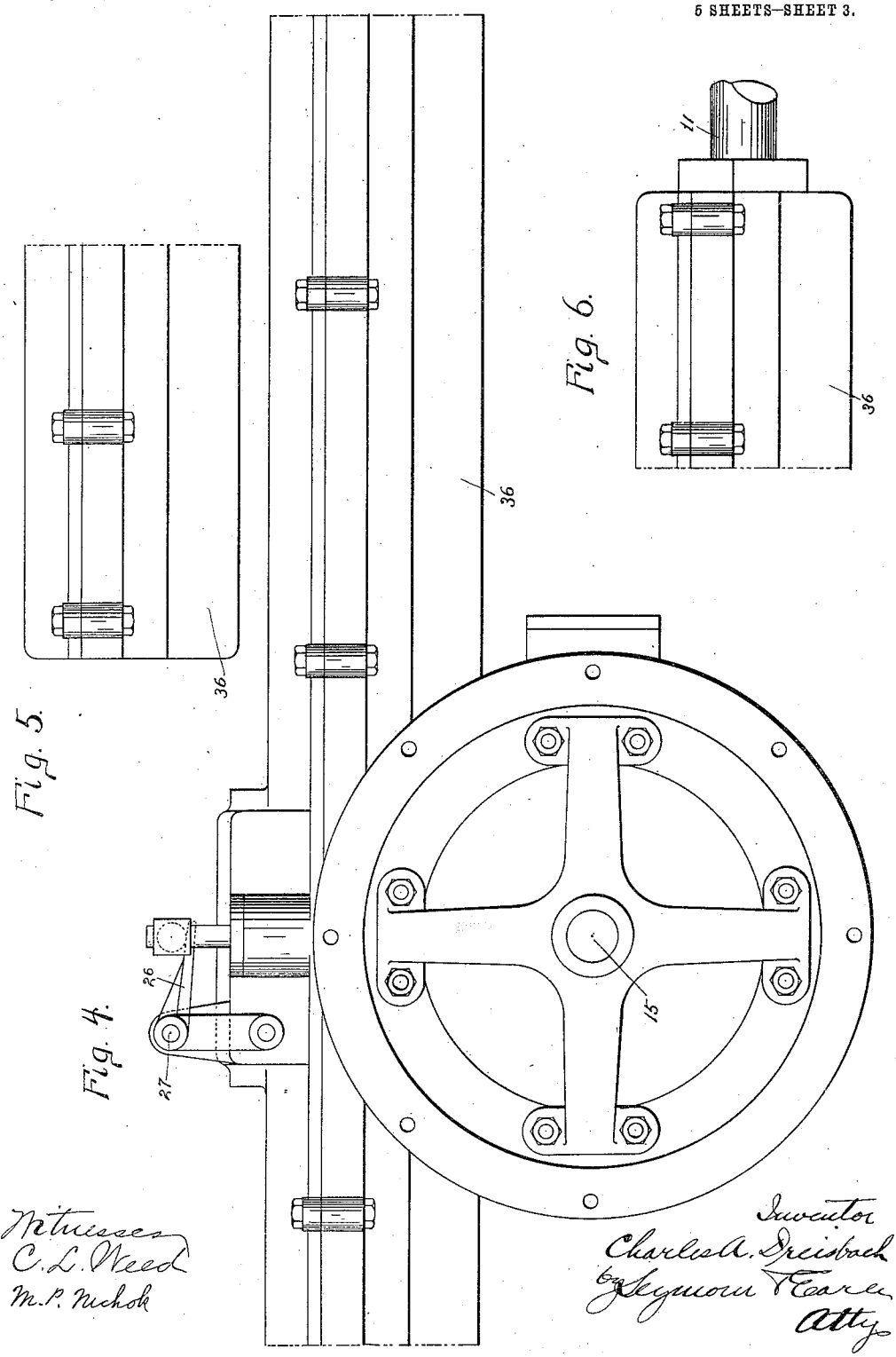

C. A. DREISBACH.
VARIABLE SPEED TRANSMISSION MECHANISM.
APPLICATION FILED OCT. 11, 1911.
1,046,156.
Patented Dec. 3, 1912.
5 SHEETS—SHEET 4.
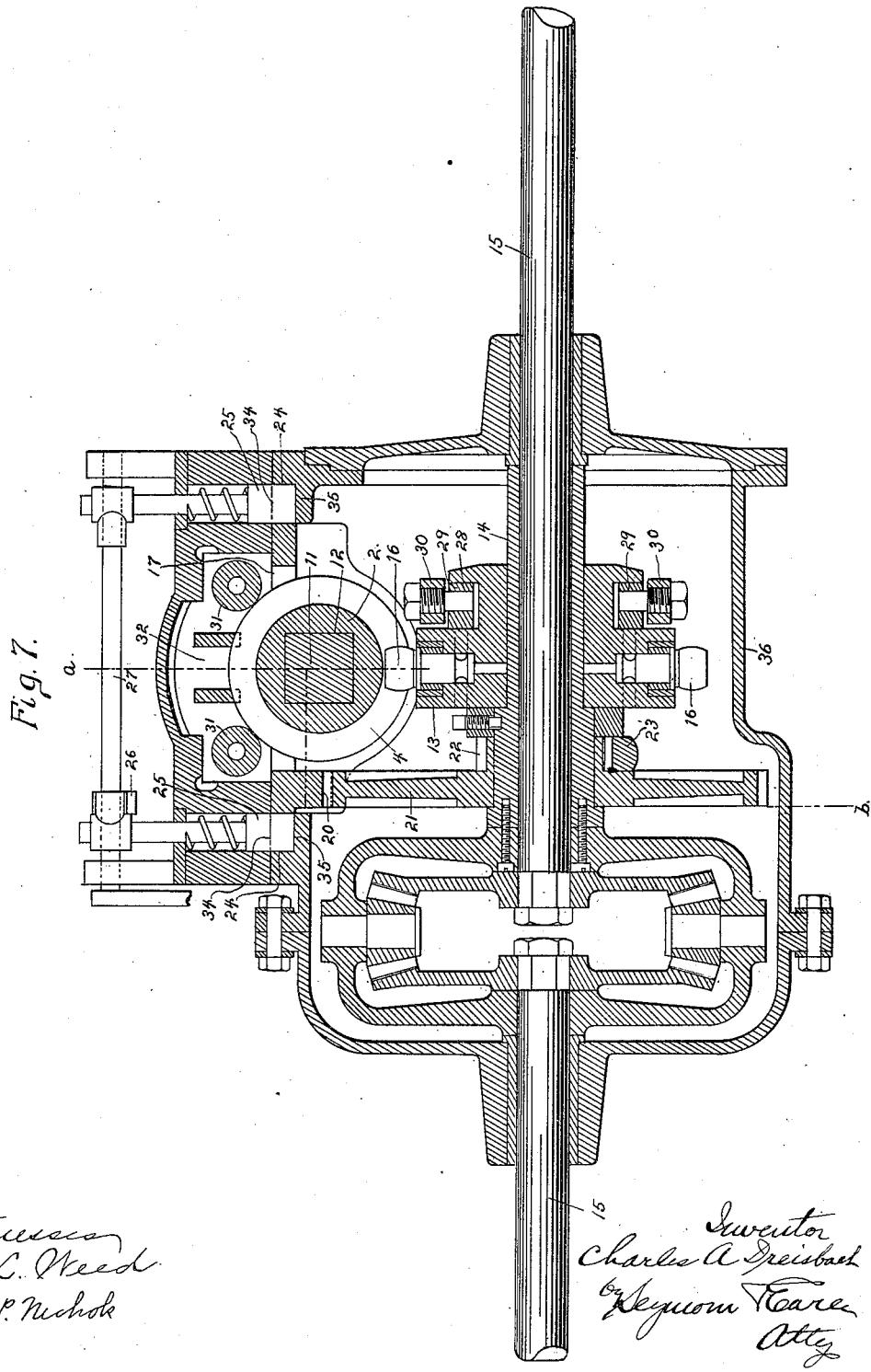

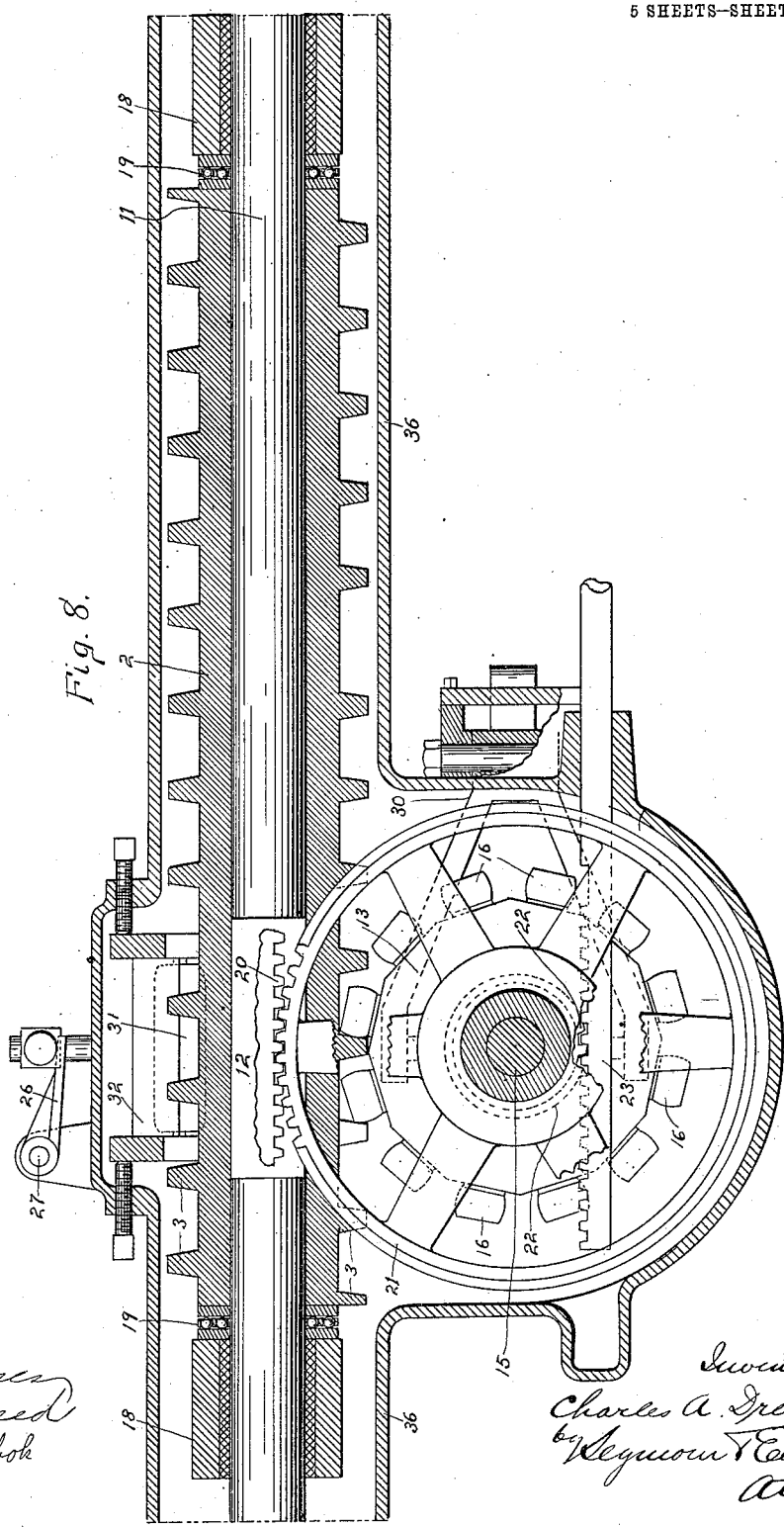

UNITED STATES PATENT OFFICE.

CHARLES A. DREISBACH, OF NEW HAVEN, CONNECTICUT.

VARIABLE-SPEED TRANSMISSION MECHANISM.

1,046,156.

Specification of Letters Patent.  Patented Dec. 3, 1912.

Application filed October 11, 1911. Serial No. 653,984.

*To all whom it may concern:*

Be it known that I, CHARLES A. DREISBACH, a citizen of the United States, residing at New Haven, in the county of New Haven and State of Connecticut, have invented a new and useful Improvement in Variable-Speed Transmission Mechanism; and I do hereby declare the following, when taken in connection with the accompanying drawings and the letters of reference marked thereon, to be a full, clear, and exact description of the same, and which said drawings constitute part of this specification, and represent, in—

Figure 1 a broken top or plan view of a variable speed transmission mechanism constructed in accordance with my invention, and showing the cover removed. Fig. 2 a plan view of one end of the casing, being a continuation of the left hand end of Fig. 1. Fig. 3 a similar view of the right hand of the machine, being a continuation of the right hand end of Fig. 1. Fig. 4 a side view of a portion of the transmission gearing with the differential casing removed. Fig. 5 is the left hand end of Fig. 4. Fig. 6 is the right hand end of Fig. 4. Fig. 7 is a transverse sectional view. Fig. 8 a vertical, longitudinal sectional view on the line $a$—$b$ of Fig. 7. Fig. 9 a sectional view on the line $c$—$d$ of Fig. 1 with the cap in place.

This invention relates to an improvement in variable speed transmission, and while especially applicable for use in automobiles or motor cycles, is equally applicable for machine tools and other work where variable speed is required.

The object of this invention is to provide simple and convenient means whereby a machine may be changed from one speed to another without danger of breaking the parts; and the invention consists in the construction hereinafter described and particularly recited in the claims.

In carrying out my invention I employ a worm screw 2 having at one end a left hand or reverse thread 3 which extends twice or more times around the worm, and is of what I will call slow pitch. Starting from the end of this reverse thread 3, is a right hand thread which extends to the end of the worm. This thread varies in pitch so that from the point $a$ to $b$ the thread 4 is of low pitch; from $c$ to $d$ the portion 5 is of low medium pitch; from $e$ to $f$ the portion 6 is of high medium pitch; and from $g$ to $h$ the portion 7 is of the maximum or high pitch. It will be understood that the thread is continuous from one end of the worm to the other. The number of the threads on the worm may be varied according to the size of the machine, and it will be understood that the reverse thread 3 may be right hand, and the thread 4 of left hand according to the direction in which the machine runs. To preserve equal centers a short extra thread 8 is run in with the portion 5, and with the portion 6 are two extra threads 9 to reverse centers, and with the portion 7 are three or more extra threads 10. This worm is mounted on a driving shaft 11 having a squared portion 12 which closely fits the interior of the worm so that motion is imparted to it. Coöperating with the worm is a gear 13 slidably mounted on a squared sleeve 14 which revolves on the differential or driven shaft or axle 15 which may be the rear axle of an automobile or shaft to be driven. This gear 13 instead of being formed with fixed teeth, is formed with round-headed roller pins 16 equally spaced and revolubly mounted in the periphery of the gear 13. These pins are interlocked and bushed in any suitable manner which permits them to revolve. These pins reduce friction and permit the ready engagement of the gear with the worm.

The worm is mounted in a frame 17 the ends 18 of which bear on the shaft 11, and between the ends of the worm 2 and the bearings 18 are antifriction thrust blocks 19. The frame 17 has flanges 34 which rest upon shoulders 35 in the casing 36. The under face of one side of the frame 17 is formed with a rack 20 which is engaged by a large gear wheel 21 loosely mounted on the sleeve 14 and formed integral with a small pinion 22 which is engaged by a rack 23 operated from any convenient position. By moving this rack 23 the worm will be shifted from one position to another so as to turn the gear in the desired direction and at the desired speed. In order to hold the worm in fixed relation to the gear at different points, the flanges 34 on opposite sides are notched as at 24 into which spring plungers 25 extend, and these plungers or latches are adapted to be raised by an arm 26 on a shaft 27 which may be turned from any convenient point. In order to shift the gear to the reverse it must first be disengaged from the worm, and for this purpose the gear is formed on one side with a groove 28 in which a collar 29 loosely fits, and this collar is operated by a shifting arm 30 and so that the gear may be moved to one side out of the path of the threads on the worm. The gear may be thrown out of engagement with the worm if desired when shifting from low to high or high to low.

To reverse the motion of the machine, the worm is unlocked and moved to the extreme right which brings the reverse thread 3 over the worm gear so as to reverse the movement of the rear axle or shaft 15. If while the worm frame is shifted to its high speed position and is then unlocked and the gear 13 is not moved out of engagement with the worm, the worm will at once be moved to its low speed position by means of the continuous thread and so that to change from high speed to low, it is only necessary to release the worm frame. To prevent upward thrust of the worm, antifriction rollers 31 are mounted in an adjustable frame 32 held in place by the cover for the casing.

In starting the machine, the normal position is with the low speed portion of the thread on the worm in position to engage the gear wheel. Then if the worm is moved to the left the increase in pitch and the extra threads will increase the movement of the gear, and hence increase the movement of the machine; but before moving the worm the spring plungers 25 must be raised so as to release the worm frame from the casing. The gear wheel is then moved to one side which may be done by a foot pedal, and then the worm moved to the desired extent to bring the portion of the thread of the desired pitch into line with the gear wheel, and the worm may be moved from low to high speed at one motion or stopped at any intermediate point. When stopped the spring plungers are dropped to lock the worm in position and the gear wheel moved back into engagement with the worm if it has been moved. In the case of an automobile, the driven portion of the rear axle is connected with the other portion through a differential gearing as shown in Fig. 7, but which forms no part of this invention and which does not need further description other than to say that it is driven by the sleeve 14 to which it is rigidly connected.

I claim:—

1. In a variable speed transmission mechanism, the combination with a gear and worm, said gear carrying in its periphery roller pins adapted to be engaged by the said worm, and means for shifting said worm.

2. In a variable speed transmission mechanism, the combination with a gear and worm, said gear carrying in its periphery roller pins adapted to be engaged by the said worm, means for shifting said worm, and means for moving the gear out of engagement with said worm.

3. A variable speed transmission mechanism comprising a worm and a gear, a frame in which the worm is mounted, means for shifting the frame and worm, means for locking the frame at its various points of adjustment, and means for moving the gear into and out of engagement with said worm.

In testimony whereof, I have signed this specification in the presence of two subscribing witnesses.

CHARLES A. DREISBACH.

Witnesses:
FREDERIC C. EARLE,
CLARA L. WEED.

---

Copies of this patent may be obtained for five cents each, by addressing the "Commissioner of Patents, Washington. D. C."